Aug. 7, 1945.         J. I. CANTRAL         2,381,258
                      HITCH DEVICE
        Filed May 10, 1943         2 Sheets-Sheet 1
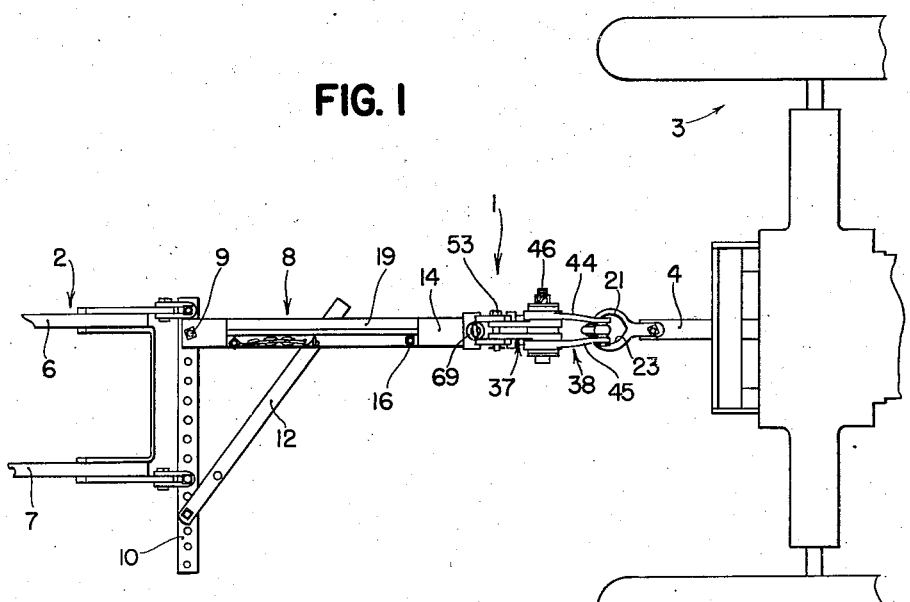
FIG. 1
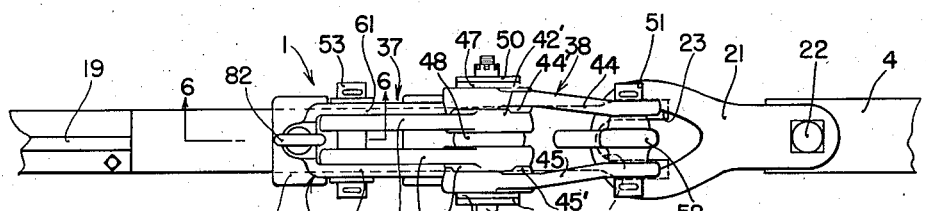
FIG. 2
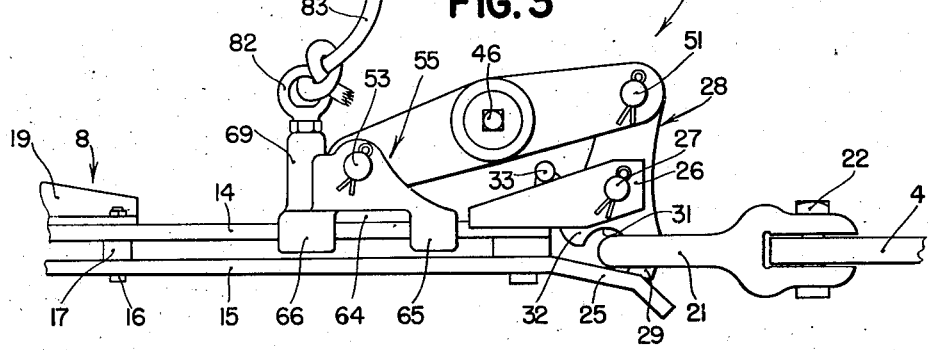
FIG. 3
INVENTOR.
JOHN I. CANTRAL
ATTORNEYS Aug. 7, 1945.  J. I. CANTRAL  2,381,258
HITCH DEVICE
Filed May 10, 1943  2 Sheets-Sheet 2

INVENTOR.
JOHN I. CANTRAL
BY

ATTORNEYS

Patented Aug. 7, 1945

2,381,258

UNITED STATES PATENT OFFICE 2,381,258

HITCH DEVICE

John I. Cantral, Moline, Ill., assignor to Deere & Company, Moline, Ill., a corporation of Illinois Application May 10, 1943, Serial No. 486,436

15 Claims. (Cl. 280—33.16)

This invention relates generally to agricultural implements and more particularly to release hitches and the like adapted to be tripped in the event of an overload.

The object and general nature of the present invention is the provision of a hitch device that is adapted to be released and reconnected manually. More particularly, it is a feature of this invention to provide a pivoted draft-receiving lever and an associated toggle link unit that is anchored to the hitch member by releasable means, whereby, when the locking unit is in operative position said toggle links maintain the draft connections until an overload occurs, and when the locking means is in a released position, the hitch is disabled and may be connected and reconnected by hand.

A further feature of the present invention is the provision of a release hitch having a biased toggle link arrangement in which all of the relatively movable parts are well protected and the resilient means occupies only a small space, thereby providing a neat and inexpensive construction.

These and other objects and advantages of the present invention will be apparent after a consideration of the following detailed description, taken in conjunction with the accompanying drawings.

In the drawings:

Figure 1 is a plan view of a hitch between a plow and a tractor, illustrating the principles of the present invention.

Figure 2 is an enlarged plan view of the hitch.

Figure 3 is a side view of the hitch shown in Figure 2.

Figure 4:
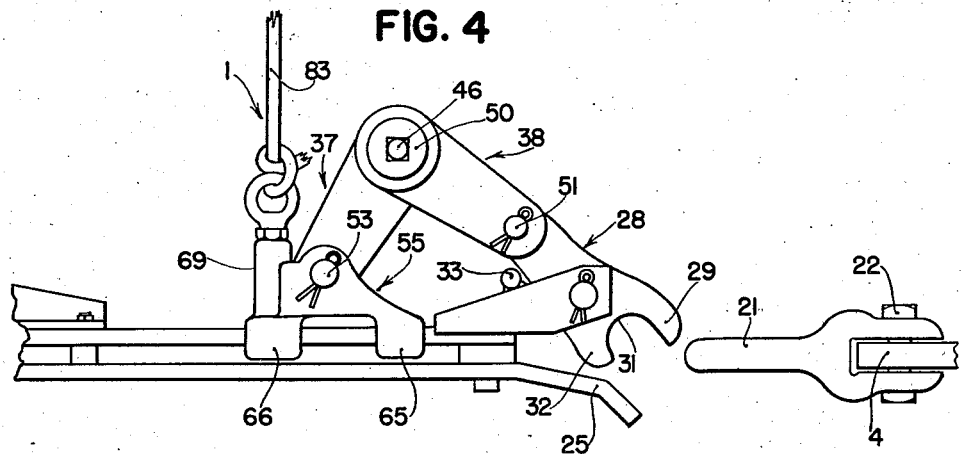
Figure 4 is a view similar to Figure 3 but showing the hitch in a position after it has been tripped by an abnormal overload.

Referring first to Figure 1, the hitch, which is indicated in its entirety by the reference numeral 1 and which incorporates the principles of the present invention, is shown as connected between a tractor plow 2 and a farm tractor 3. The latter is of conventional type and is provided with a rear drawbar 4. Likewise, the plow 2 is of conventional construction, incorporating two plow beams 6 and 7 to which the rear portion of the hitch member 8 is connected, as by being bolted, as at 9, to a transverse hitch bar 10, the hitch member 8 being reenforced by a brace 12 connected at its rear end to the hitch bar 10 and at its forward end to the hitch member 8. As best shown in Figure 3, the latter member comprises upper and lower strap members 14 and 15 connected together in spaced apart relation by bolts 16 and spacers 17. The hitch member 8 also includes a reenforcing bar 19.

The hitch 1 includes a draft member 21 which is adapted to be bolted, as at 22, to the rear end of the tractor drawbar 4. The rear portion of the draft member 21 is formed with a loop or eye 23. The lower strap member 15 of the hitch member 8 is extended forwardly and downwardly, as at 25, to form a guide plate. On the forward end of the upper bar 14 a pair of brackets 26 is mounted, preferably by welding or the like. The brackets 26 support a pin 27 which passes through an opening in the intermediate portion of a draft-receiving lever 28 whereby the latter is swingable in a generally horizontal plane about a transverse axis.

The lower end of the lever 28 is formed with a hook section 29, a draft member receiving recess 31 and a rear abutment section 32. Welded to the upper edges of the brackets 26 is a stop rod 33 which, as best shown in Figure 4, limits the rearward swinging movement of the draft-receiving lever 28. The front portion 25 of the lower hitch member 15 is formed as a guide plate having its center section cut out or recessed, as at 35 (Figure 2) to receive the hook 29 and the abutment 32 of the lever 28, when the latter is in the position shown in Figure 3. A pair of toggle links 37 and 38 are provided, each link consisting of two members 42 and 43, and 44 and 45, as best shown in Figure 2. These members are pivotally interconnected by a pivot bolt 46, and the pivoted sections of the link members are provided with cam sections 42', 43', 44' and 45'. These cam sections are similar to those shown in my co-pending application, Serial No. 391,742, filed May 3, 1941, now U. S. Letters Patent No. 2,337,026, dated December 21, 1943, to which reference may be made if necessary. Resilient elements 47, 48 and 49 in the form of rubber or rubber-like blocks or bushings are confined between plates or caps 50 at the ends of the bolt 46, and between the two toggle link members 42 and 43. The bolt is tightened just enough to hold the parts in position but not enough to cause the rubber to flow. The rubber blocks are, however, effective to resist angular displacement of the toggle links 37 and 38 since any angular displacement causes the cam sections to ride up one on the other and compress the rubber blocks.

Figure 5:
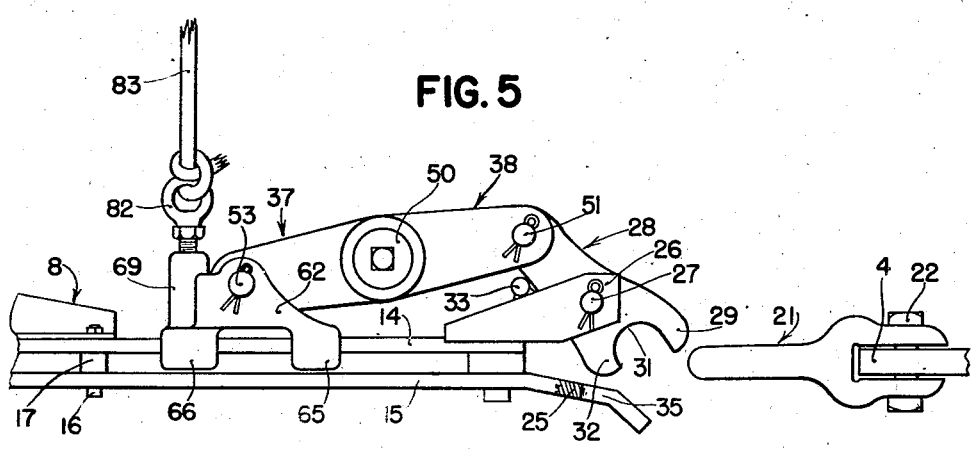
Figure 5 is a view similar to Figure 2 but showing the parts in the positions they occupy when the hitch has been manually released.

The forward ends of the toggle link members 44 and 45 are apertured to receive a pin 51 which also passes through the upper end 52 of the lever 28, and the rear ends of the toggle link members 42 and 43 are apertured to receive a pivot pin 53 which is carried in a slide or anchoring member indicated in its entirety by the reference numeral 55. The cam sections of the above-mentioned toggle links are so formed that when the toggle is extended, as shown in Figures 3 and 5, the pivot bolt 46 lies slightly above a line connecting the centers of the pivot pins 51 and 53.

Figure 6:
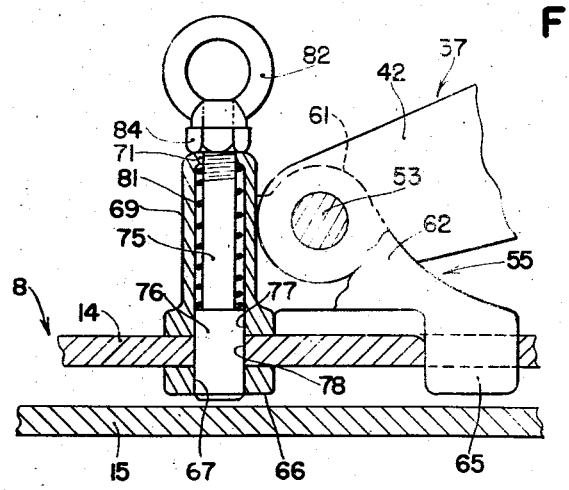
Figure 6 is a sectional view taken generally along the line 6—6 of Figure 2.
Figure 6:

The slide or anchoring member 55 is preferably in the form of a casting, having a pair of side sections 61 and 62 joined to a base section 64 at the end of which loop sections 65 and 66 are disposed. The loop sections 65 and 66 are apertured to receive the upper member 14, and as best shown in Figure 6, the lower wall of the rear loop section 66 is apertured, as at 67. Rearwardly the side sections 61 and 62 are joined to a vertical sleeve section 69 which at its upper end is formed with a shoulder 71 surrounding an aperture 72. A plunger 75 is disposed within the sleeve section 69 and at its lower end is formed with or carries a head 76 which is adapted to extend downwardly through an opening 77 in the upper section of the loop 66 and to enter an opening 78 formed in the upper section 14 of the hitch member 8. A compression spring 81 is disposed within the sleeve 69 and at its lower end bears against the head 76 and at its upper end against the shoulder 71. The upper end of the plunger extends outwardly through the opening 72 and is threaded to receive an eye 82 to which a rope or cable 83 is connected. A lock nut 84 is also threaded onto the upper end of the plunger 75 for the purpose of securing the eye in position.

The normal operating position of the parts is shown in Figure 3, with the slide 55 forward and the hook 29 engaged in the aperture 23 in the draft member 21, and with the toggle links 37 and 38 in their approximately straight line relation. In this position of the slide 55, the head 76 of the plunger seats in the opening 78 in the member 14, thus locking the slide or anchor 55 in place on the member 14. In the event of an overload, as by the plow 2 striking an obstruction, the abnormal forward pull exerted on the hook portion 29 of the lever 28 causes the latter to buckle the toggle links upwardly, the lever 28 swinging in a counterclockwise direction until it engages the stop rod 33. The position of the parts when this occurs is shown in Figure 4, from which it can be seen that the draft member 21 is released from the hitch member 8.

It is to be noted that each cam face 42', 43', 44' and 45' is formed on a separate link, rather than having two faces formed on one part. Forming each cam face on its own link, makes it possible to have the proper angular relation between each cam face and the longitudinal axis of the associated link. If two faces were mounted on one part, the cooperating links might not line up properly, due to errors arising from manufacturing tolerances.

As explained more in detail in my co-pending application mentioned above, the cam sections on the toggle links are so constructed that when the toggle is buckled or broken (Figure 4) the links tend to remain in that position with the rubber blocks under compression. To reconnect the implement, all that it is necessary to do is to back the tractor, lifting the front end of the hitch by the cable 83, until the hitch is in a position such that the rear end of the draft member 21 will engage the abutment extension 32 on the toggle lever 28, whereupon further backing of the tractor will rock the toggle lever 28 in a clockwise direction (Figure 4), thus straightening the toggle links 37 and 38. Lifting the hitch by the cable 83 may withdraw the plunger head 76 from the opening in the hitch member 14, but this has no effect because the toggle links 37 and 38 remain in their angled position until forced out of that position by backing the tractor and swinging the lever 28 in a clockwise direction, as just described.

Whenever the parts are in their operating position, the draft member 21 may be released at any time desired merely by pulling upwardly on the cable 83. The latter may, if desired, be tied to the tractor seat, but preferably the cable 83 is tied to one of the adjusting levers of the plow that in operation is accessible to the operator on the tractor. Pulling upwardly on the cable 83 will, as best shown in Figure 6, withdraw the plunger head 76 from the opening in the member 14. With the hitch parts in the positions shown in Figure 3, the tractor may then be driven forwardly away from the implement, the lever 28 being swung in a counterclockwise direction, forcing the slide or anchoring member 55 into a rear position, such as is shown in Figure 5. When it is desired to reconnect the tractor to the implement, the tractor may be backed into position in much the same manner as described above, the resulting clockwise swinging of the toggle lever 28 serving to move the slide 55 forwardly until the plunger is in a position to reengage in the opening 78 in the member 14, the plunger also moving downwardly under the influence of the spring 81 until the plunger head 76 engages the lower opening 67.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural machine, a pair of parts adapted to be releasably connected, a pivoted member mounted on one of said parts and receiving the other part whereby when a force is exerted on said other part in one direction, said pivoted member tends to swing about its pivoted support on said one part, a second member slidably mounted on said one part, means releasably holding said second member in a given position on said one part, and motion resisting means connected between said second member and said pivoted member whereby, as long as said second member is connected with said one part in said position, separation of said other part relative to said one part is restrained.

2. In an agricultural implement, a hitch member, a draft-receiving member pivoted to said hitch member, a pair of pivotally interconnected toggle members, one pivoted to said draft-receiving member, a part movably associated with said hitch member and to which the other of said toggle members is connected, and biased means releasably connecting said part with said hitch member.

3. In an agricultural implement, a tractor hitch for connecting the implement with a tractor, comprising a draft member adapted to be connected to the tractor and to be releasably connected with said implement, a hitch member carried by said implement and including a guide plate extending generally forwardly and downwardly, a lever pivoted to said hitch member and having a recessed section adapted to receive said draft member in one position of the lever relative to said guide plate and to cooperate with the latter to prevent said draft member from separating from said hitch member, the forward pull exerted by said draft member being taken by said lever, a pair of pivotally interconnected toggle links, one pivoted to the outer end of said lever, means resisting movement of said toggle links out of their extended position, a part movably carried by said hitch member for receiving the reaction of said toggle links, and means detachably connecting said part to said hitch member.

4. An overload release hitch comprising a hitch member, a draft transmitting member, a lever pivoted to the forward end of said hitch member and adapted to receive draft from said draft member, means including a pair of toggle links connected between said hitch member and said lever for resisting movement of the latter under the influence of transmitted draft forces, said toggle links having interengaging cam surfaces and resilient means associated therewith for resisting angular movement of one toggle link relative to the other, said toggle links being adapted to remain in an angled position when once moved into that position, as by an abnormal draft load, and means carried by said lever to receive the draft member when the latter is moved rearwardly, said means acting to swing said lever in a direction to straighten said toggle links and restore them to operative position.

5. In an overload release hitch device, a hitch member, a draft member adapted to be releasably connected thereto, a part movably mounted on said hitch member and adapted to be releasably locked thereto in one position, and yieldably connected mechanism reacting against said part for restraining separation of the draft member from said hitch member, said restraining means being ineffective when said part is released from said hitch member.

6. In a coupling device, a hitch member having a bracket at its forward end, a lever pivoted at an intermediate point on said bracket, said lever having a draft-receiving hook at its lower end cooperating with a portion of said hitch member to prevent release of a draft member engaged thereby, trip means normally connected with said hitch member so as to be capable of acting between said lever and said hitch member for normally preventing rotation of said lever out of a position connecting said draft member to said hitch member, and means for manually releasing said trip means from its connection with the hitch member so as to provide for disengagement of said draft member at will.

7. In a coupling device, a hitch member adapted to be hitched to a draft member, a slide mounted on said hitch member and including a spring pressed plunger engageable in an opening in said hitch member for locking the slide in one position, said plunger being releasable to accommodate movement of said slide relative to said hitch member, a movable part adapted to releasably connect said draft member to said hitch member, and trip means restraining movement of said movable part and anchored to said slide.

8. The invention set forth in claim 7, further characterized by said slide having portions disposed both above and below said hitch member, said plunger extending through the opening in said hitch member and into the opposite portion of said slide.

9. The invention set forth in claim 7, further characterized by said plunger being movable upwardly to release said slide, the upward movement of said plunger being limited, and a cable connected with the upper end of said plunger and adapted to control the position of the plunger and also to raise or lower the hitch member.

10. A release hitch for agricultural implements and the like, comprising a support, a draft-receiving member movably connected with said support, a quick-release overload mechanism resisting movement of said draft-receiving member, a part movable in guided relation relative to said support and connected with said mechanism, and means for releasably locking said part with said support whereby, when locked thereto, said part takes the reaction of said mechanism in restraining movement of said draft-receiving member and, when released, said part provides for unrestrained movement of said member.

11. In an agricultural implement including a pair of relatively movable parts whose relative movement it is desired to restrain, an overload release device comprising two pairs of pivotally interconnected links connected, respectively, with said parts, interengaging cam means on said links, a pivot bolt extending through the portions of said links having said cam means, said links being arranged so that one link of each of said pairs lies adjacent but spaced from the corresponding link of the other pair, a resilient element surrounding said pivot bolt and confined between said adjacent links, a pair of resilient elements, one disposed at the outer side of each of the other links, a pair of pressure plates disposed outwardly, respectively, of said pair of resilient elements and connected with the ends of said pivot bolt, and means pivotally connecting said adjacent links with one of said implement parts and the other links with the other implement part.

12. In an agricultural implement including a pair of relatively movable parts whose relative movement it is desired to restrain, an overload release device comprising two pairs of pivotally interconnected links connected, respectively, with said parts, interengaging cam means on said links, a pivot member connecting the portions of said links having said cam means and defining an axis of pivotal connection between said links, the latter being arranged so that one link of each of said pairs lies adjacent but spaced from the corresponding link of the other pair, a resilient element surrounding said pivot member and confined between said adjacent links, and means pivotally connecting said adjacent links with one of said implement parts and the other links with the other implement part.

13. In an agricultural implement including a pair of relatively movable parts whose relative movement it is desired to restrain, an overload release device comprising two pairs of pivotally interconnected links connected, respectively, with said parts, interengaging cam means on said links, a pivot member extending through the portions of said links having said cam means, said links being arranged so that one link of each of said pairs lies adjacent the corresponding link of the other pair, a pair of resilient elements, one disposed at the outer side of each of the other links, a pair of pressure plates disposed outwardly, respectively, of said pair of resilient elements and connected with the ends of said pivot member, and means pivotally connecting said adjacent links with one of said implement parts and the other links with the other implement part.

14. In an agricultural implement including a pair of relatively movable parts whose relative movement it is desired to restrain, an overload release device comprising two pairs of pivotally interconnected links, the outer end of each of said links being apertured, means disposed in said apertures for connecting said pairs of links with said implement parts, inter-engaging cam means on said links, the angular relation between the cam means and the longitudinal axis of the links are determined by their apertured outer ends being identical, whereby said links are interchangeable, a pivot member extending through the portions of said links having said cam means, and means including resilient means for holding the inter-engaging cam means in engagement under normally encountered loads.

15. In a coupling device, a hitch member, a lever pivoted at an intermediate point on said hitch member, said lever having a draft-receiving hook at one end cooperating with a portion of said hitch member to prevent release of a draft member engaged thereby, and a pair of pivotally interconnected toggle links pivotally connected between said hitch member and the other end of said lever, said toggle links having cooperating cam faces, each equipped with a dwell portion arranged so that excessive draft acts through said lever to buckle said toggle links and force the dwell portions of said cam faces into engagement, and resilient means acting against said toggle links and cooperating with said cam faces for resisting displacement of said toggle links until said dwell portions come into engagement, whereby said resilient means serves to hold said toggle links in their angularly displaced position, said links being moved out of said latter position by movement of said lever, as by reengagement with said draft member.

JOHN I. CANTRAL.